US011536875B2

United States Patent
Kim et al.

(10) Patent No.: US 11,536,875 B2
(45) Date of Patent: Dec. 27, 2022

(54) METHOD FOR SUBLIMATION COATING ON OPTICAL LENS

(71) Applicant: KH9100 LLC, La Crescenta, CA (US)

(72) Inventors: Kelly H. Kim, Santa Clarita, CA (US); Dong Kwan Lee, Montrose, CA (US)

(73) Assignee: KH9100 LLC, La Crescenta, CA (US)

( * ) Notice: Subject to any disclaimer, the term of this patent is extended or adjusted under 35 U.S.C. 154(b) by 779 days.

(21) Appl. No.: 16/373,520

(22) Filed: Apr. 2, 2019

(65) Prior Publication Data

US 2020/0319374 A1    Oct. 8, 2020

(51) Int. Cl.
  *B29D 11/00*   (2006.01)
  *G02B 1/10*    (2015.01)

(52) U.S. Cl.
  CPC ............ *G02B 1/10* (2013.01); *B29D 11/0073* (2013.01); *B29D 11/00865* (2013.01)

(58) Field of Classification Search
  CPC ............ G02B 1/10–18; B29D 11/0073; B29D 11/00865; B29D 11/00923; B29D 11/00894
  See application file for complete search history.

(56) References Cited

U.S. PATENT DOCUMENTS

| 6,534,443 | B2 * | 3/2003 | Inuzuka | B29D 11/00903 |
| | | | | 503/227 |
| 9,278,492 | B2 * | 3/2016 | Okubo | B29D 11/00865 |
| 2002/0148053 | A1 * | 10/2002 | Inagaki | D06P 5/004 |
| | | | | 8/507 |
| 2003/0063256 | A1 | 4/2003 | Inuzuka | |
| 2005/0071934 | A1 * | 4/2005 | Inuzuka | D06P 5/2033 |
| | | | | 8/509 |
| 2019/0136367 | A1 * | 5/2019 | Peter | B29D 11/00865 |

* cited by examiner

*Primary Examiner* — Elizabeth A Burkhart
(74) *Attorney, Agent, or Firm* — Heedong Chae; Lucem, PC (57) ABSTRACT

A method to sublimate a wide variety of coatings onto optical lens includes printing a first coating using a sublimation transfer ink onto a sublimation paper, positioning the sublimation paper onto the optical lens to align the sublimation paper to a first surface of the optical lens, placing the sublimation paper thereon, preheating a chamber of a vacuum oven to a predetermined temperature, placing the optical lens into the chamber of the vacuum oven with the first surface of the optical lens facing upward, closing the vacuum oven and setting a predetermined time for heating, heating and vacuuming the chamber of the vacuum oven during about the predetermined time such that the first coating sublimates onto the first surface of the optical lens from the sublimation paper, removing from the vacuum oven and cooling the optical lens having the first coating on its first surface.

16 Claims, 7 Drawing Sheets

METHOD FOR SUBLIMATION COATING ON OPTICAL LENS

FIELD OF THE INVENTION

The present invention relates to a method for sublimation on an optical lens, more particularly, a method for the sublimation of a coating to an optical lens that include coatings relating to colors and/or designs.

BACKGROUND OF THE INVENTION

The coating of optical lenses has been popular over the years for a number of reasons. For active individuals, tinted coatings provide a wide variety of benefits, particularly for different outdoor sports and activities. In fact, oftentimes a specific tint color is preferred for particular activities due to the tinted coat of an optical lens being able to absorb transmitted light of specific wavelengths that make such lenses amenable to those activities. Furthermore, when color tinted optical lens carry designs, the lens now can be appreciated for their aesthetic qualities rather than just the protection they offer to their wearers.

Unfortunately, dyeing lens and affixing designs onto them are processes that are often time consuming and cumbersome, which may lead to unsatisfactory results such as lackluster longevity and durability. The traditional dip-dyeing method can only be used for the tinting of lens and the drawbacks of this technique are well-known. Most often, the chief complaint of this method is the lack of longevity and uneven depositing of the dye onto the optical lens. Specifically, the dye coating can be easily etched off or is susceptible to being scratched due to the relatively poor adhesion between the dye used in the dip-dyeing method and the optical lens. Vapor-deposition of dyes onto optical lens also can only be used for tinting rather than depositing designs (simple or complicated designs) onto an optical lens in a 1:1 manner. Furthermore, vapor-deposition of dyes is often time consuming.

This invention is directed to solve these problems and address a long-felt need.

SUMMARY OF THE INVENTION

The present invention contrives to solve the disadvantages of the prior art. The present invention directed to a method for sublimating a coating onto an optical lens that includes the steps of printing a first coating using a sublimation transfer ink onto a sublimation paper; positioning the sublimation paper onto the optical lens such that the first coating printed on the sublimation paper is aligned to the first surface of the optical lens; placing the sublimation paper onto the first surface of the optical lens and securing the sublimation paper onto the first surface of the optical lens; preheating a chamber of a vacuum oven to a predetermined temperature; placing the optical lens into the chamber of the vacuum oven with the first surface of the optical lens facing upward; closing and locking the vacuum oven and setting a predetermined time for heating; heating and vacuuming the chamber of the vacuum oven during about the predetermined time such that the first coating sublimates onto the first surface of the optical lens from the sublimation paper; removing from the vacuum oven the optical lens having the first coating on the first surface of the optical lens; and cooling the optical lens.

The object of the present invention is to provide a method to transfer a first coating onto a first surface of an optical lens via sublimation and then transfer a second coating onto a second surface of the optical lens.

Another object of the present invention is to provide is to provide a method to transferring first and second coatings onto the first and second surfaces of an optical lens via sublimation simultaneously.

The advantages of the present invention are: (1) speed of which dyeing an optical lens can be accomplished; (2) convenience due to the small space occupied by sublimation printers and vacuum ovens; (3) multiple shapes, patterns, and/or colors that can be sublimated onto the optical lens; (4) long-term retaining of the unique color and/or design on the optical lens from the sublimation of the tintable coating thereon when exposed to sunlight; (5) long-term retaining of the unique color and/or design sublimated onto the optical lens when the lens comes into contact with various chemicals; (6) an additional hardcoat layer to the surfaces of the optical lens following the sublimation of color(s) and/or design(s) onto those surfaces to provide longevity and protection from damage; (7) recesses on the edges of the concave surface of the optical lens that aids in the evacuation of air between the concave surface and the sublimation paper to allow precise transfer of the color(s) and/or design(s) via sublimation to the concave surface; and (8) dual coating of color(s) and/or design(s) on front and back surfaces of the optical lens such that color(s) and/or design(s) turn back and forth (contrast or enhance each other) such that the color(s) and/or design(s) can be expressed in three dimensions.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

Reference will now be made in detail to the preferred embodiments of the present invention, examples of which are illustrated in the accompanying drawings, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

Also, as used in the specification including the appended claims, the singular forms "a", "an", and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

Figure 1:
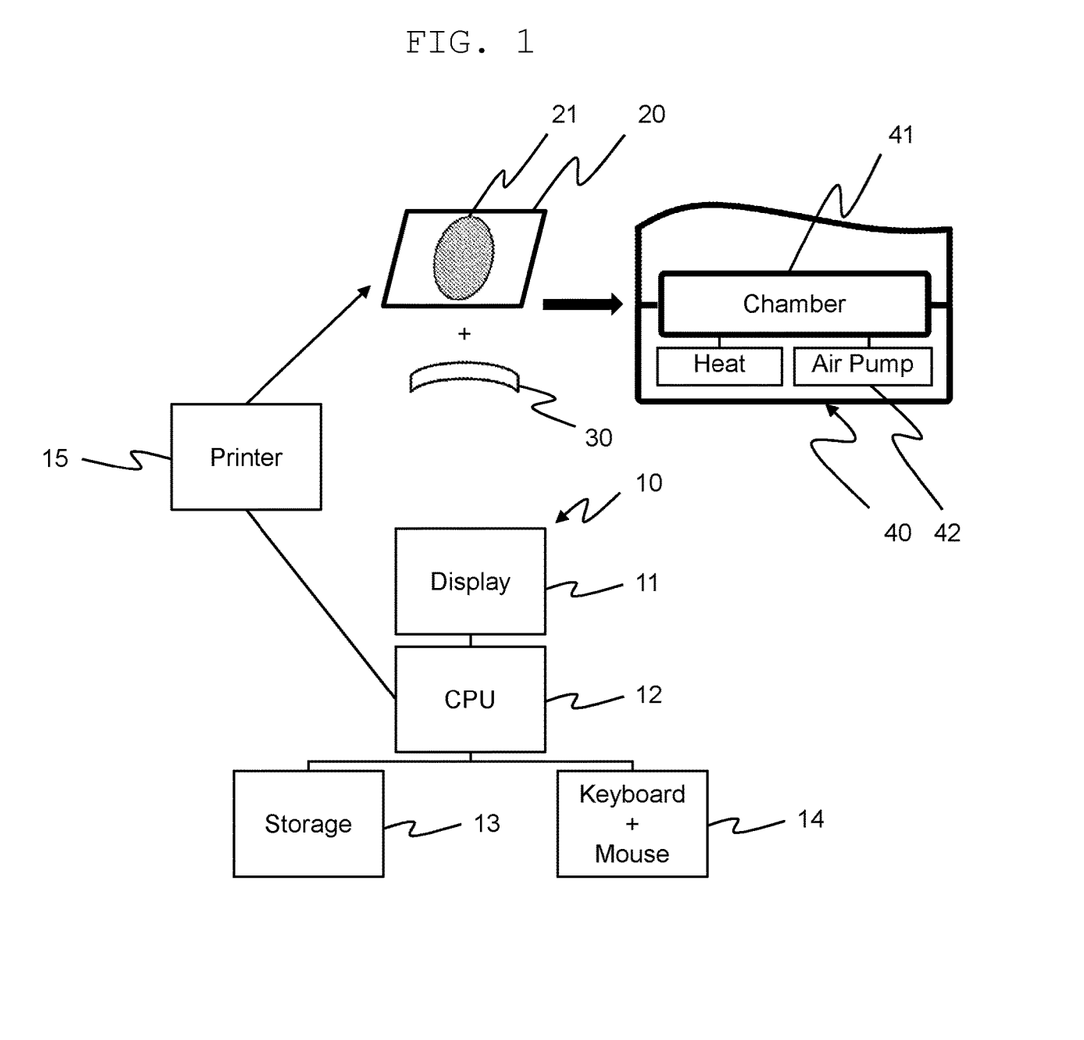
FIGS. 1 and 2 are schematic views of a system for coating optical lens via sublimation.
Figure 2:
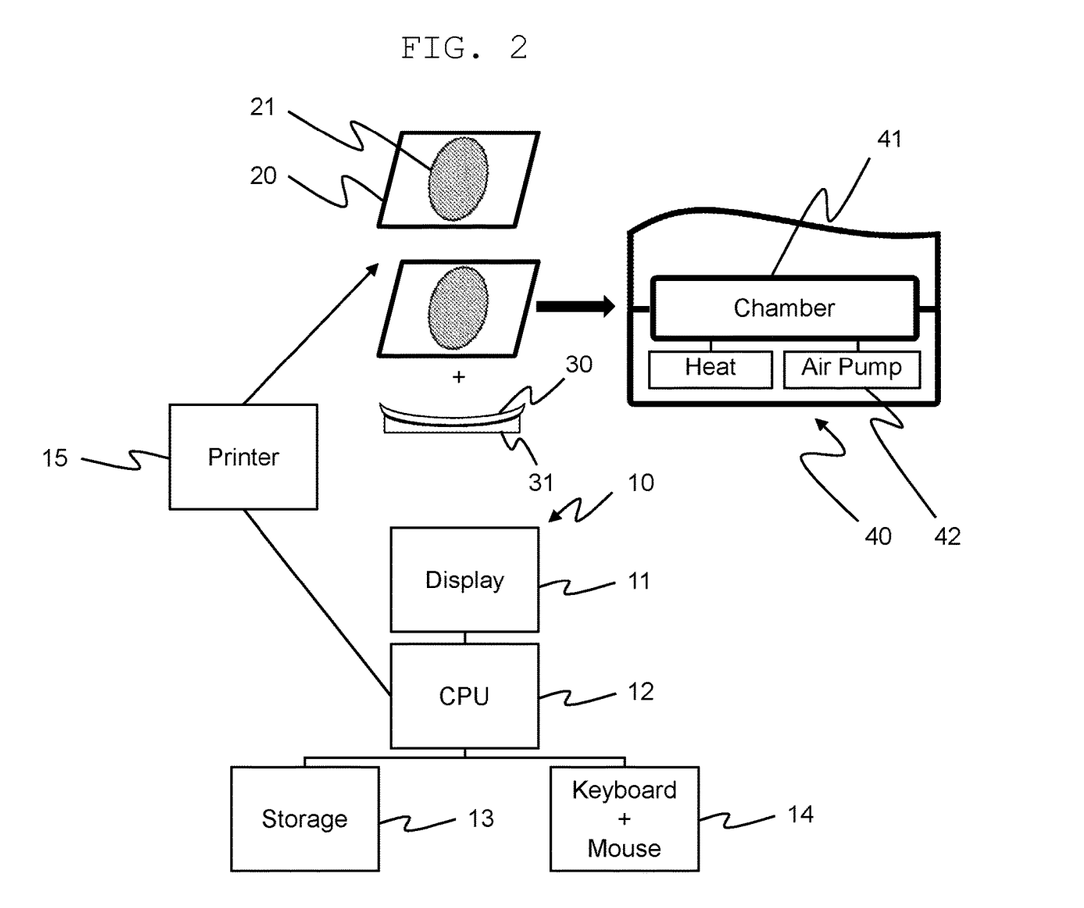

FIGS. 1 and 2 are schematic views for printing a coating 21 onto an optical lens 30, the coating 21 comprising a color and/or design, using a printer wherein the coating 21 will ultimately be transferred or deposited onto an optical lens via sublimation. On a workstation 10 that includes a display 11, CPU 12, storage 13, and a keyboard and mouse 14, a user can create a coating 21 to be sublimated onto an optical lens 30 by using the workstation's 10 software together with a keyboard and mouse 14 (or any other input devices such as a digital pen, digital canvas, accessibility input devices, and the like) or retrieve a previously made coating 21 from the workstation's 10 storage 13. Furthermore, the workstation 10 can be a desktop computer, laptop, tablet, phone, or the like that can either directly or indirectly send a coating 21 to be printed by wired or wireless connection or through storage devices and the like. Storage devices include internal hard drives (spinning or solid state), external hard drives (spinning or solid state), Universal Serial Bus ("USB") drives (e.g. flash drives, key drives, etc), secure digital ("SD") cards (e.g. microsd), and the like.

The coating 21 can be a color, a gradient of colors, a mixture of colors, a design, multiple designs or all of the above in varying combinations. This advantageous flexibility is achieved by the use of the workstation 10 to create a coating 21 wherein the coating may include any color or sets of colors or any design or sets of designs, or any combination of the preceding. Once the desirable coating 21 is created or found, the user can instruct the workstation 10 to send the coating 21 to a sublimation ink-equipped printer 15 to print out the coating 21 on sublimation paper 20. Some examples of printers 15 that can be used for this purpose include the Epson Stylus® Pro 7890, Epson Stylus® Pro 9890, Epson Stylus® C88+, Virtuoso® VJ 628, Virtuoso® SG400/SG800, or any printer 15 and the like that can be outfitted to use or accept sublimation ink(s) for printing.

The coating 21 is printed by the printer 15 onto sublimation paper(s) 20 as shown in FIGS. 1 and 2. Sublimation paper 20, a type of transfer paper constructed to accept heat-activated dyes like sublimation dyes (here, sublimation ink), can be made of polyurethane, glitter, foil, pattern paper, luminous spot phosphorescence, velvet paper, fiber reinforced plastic, or color transfer paper. As shown in FIGS. 1 and 2, the coating(s) 21 printed on sublimation paper(s) 20 should substantially correspond to the optical lens 30 with respect to the size and curvature of the surface of the optical lens 30 to be coated via sublimation. Additionally, the optical lens 30 may be made of any the following lens materials: CR-39, polycarbonate, trivex, polycarbonate, tribrid, or high-index plastics. Furthermore, the optical lens 30 may be a finished lens or a semifinished lens. Finished lens are lens that have been surfaced on both front and back surfaces to the desired power and thickness. Semifinished lens are lens with only one side having the desired curvature, also known as a blank lens whereby the other side of the semifinished lens will have to be surfaced.

Sublimation is the transition of a substance from a solid phase to a gaseous phase bypassing any intermediary liquid phase. Here, a color and/or design pattern is represented on a sublimation paper printed by an inkjet printer 15 using sublimation dyes, dyes that are able to convert from solid to gas without going through a liquid state, as a coating 21 to be transferred onto at least one surface of the optical lens 30. This conversion is initiated by heat and controlled by pressure and time.

The sublimation process in the present invention is achieved through the use of conventional vacuum ovens 40, also known commercially as heat press machines. Some examples of these vacuum ovens 40 include Sunmeta's Freesub ST-2030 and its Multi-function 3D Sublimation Vacuum Heat Press Machine Heat Transfer ST-3042. Typically, a vacuum oven 40 will have a chamber 41 that can be heated. The chamber 41 can be preheated at any time prior to closing and locking the vacuum oven 40 to sublimate a coating 41 onto an optical lens 30. Furthermore, a silicon cover sits under the lid of the vacuum oven 40 and above the chamber 41. To create a vacuum environment, the floor of the chamber 41 is connected to an air pump 42 that continuously evacuates air from the chamber 41. The flow rate achieved by the air pump 42 is about 30-40 L/min in the above ST-3042 vacuum oven 40. The continuous evacuation of air by an activated air pump 42 affects the silicon cover, wherein the silicon cover undergoes a conformational change and collapses towards the floor of the chamber 41 while, at the same time, substantially conforming to any exposed outer surfaces of any objects placed within the chamber 41 of the vacuum oven 40. Driven by an activated air pump 42, the silicon cover of the vacuum machine 40 is able to press against any exposed outer surfaces of any objects placed within the chamber 41 of the vacuum oven 40, including pressing against any covers or wrappings surrounding the objects. This pressure against objects in the vacuum oven 40 permits the coating 21 to be sublimated from the sublimation paper 20 (vacuum pressed upon the optical lens 30) to an optical lens 30, as a substantially exact copy. This advantage is extremely important when transferring color(s) and/or designs (particularly the latter) to the optical lens 30 as close to exact as to their appearance on the sublimation paper 20.

Figure 4:
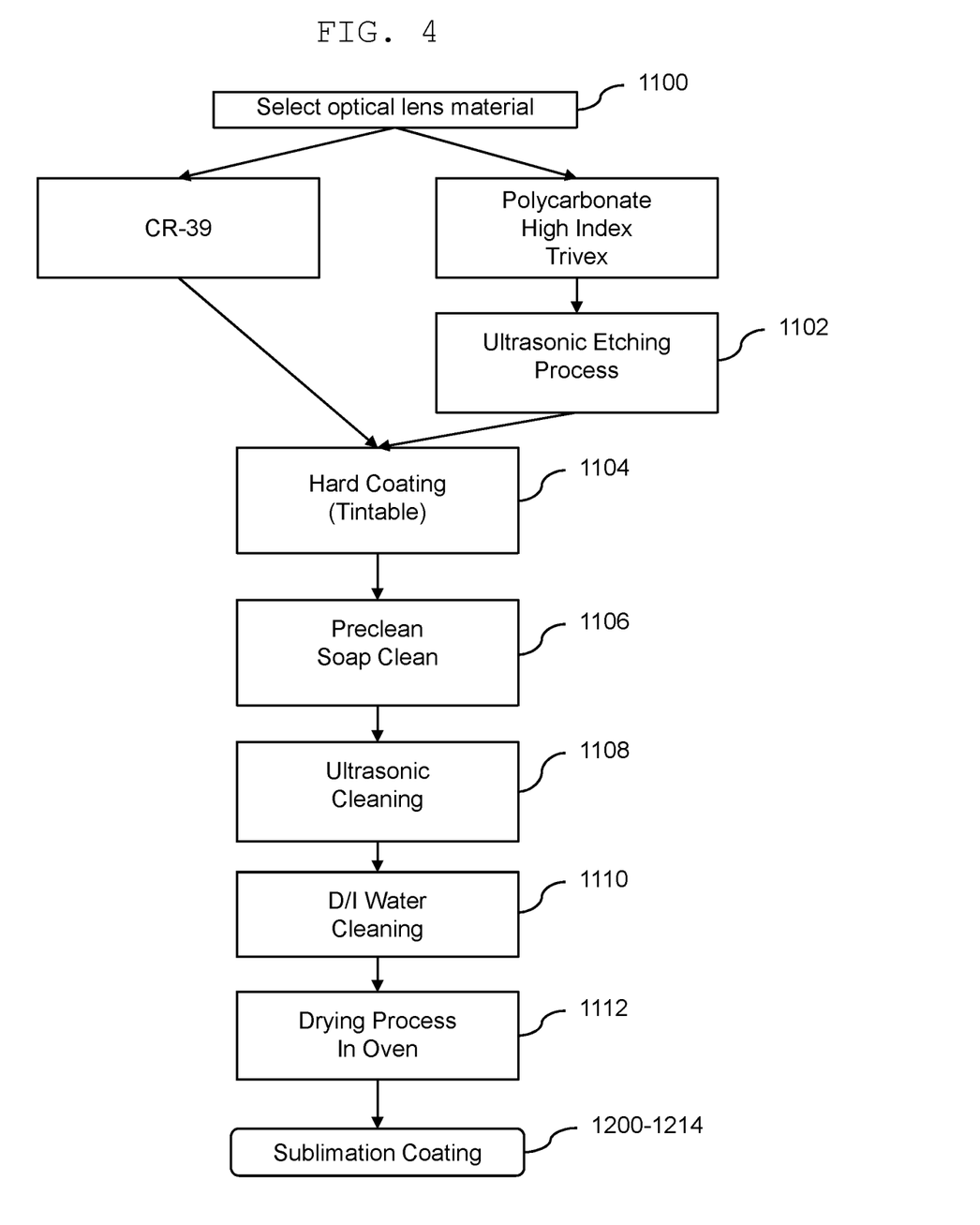
FIG. 4 is a flowchart for hardcoating an optical lens.

FIG. 4 illustrates the step of preparing the optical lens 30 to be coated via sublimation. After choosing the desired optical lens type 1100, the optical lens 30 of any material will receive a hardcoat via thermally-cured hardcoating 1104; if a polycarbonate, high index, or trivex lens is selected, then an ultrasonic etching process is performed 1102 prior to the hardcoating 1104. Briefly, thermally-cured hardcoating 1104 entails passing the optical lens 30 slowly through a liquid bath of a solvent-based hardcoat whereby the solution adheres to the surfaces of the optical lens 30. Afterwards, the optical lens 30 will undergo a series of cleanings (soap cleaning 1106, ultrasonic cleaning 1108, deionized water cleaning 1110) before being thermally cured 1112 in an oven until the hardcoating is stable. The hardcoating is necessary to provide a layer to which the sublimation ink may adhere to upon sublimation.

Figure 5:
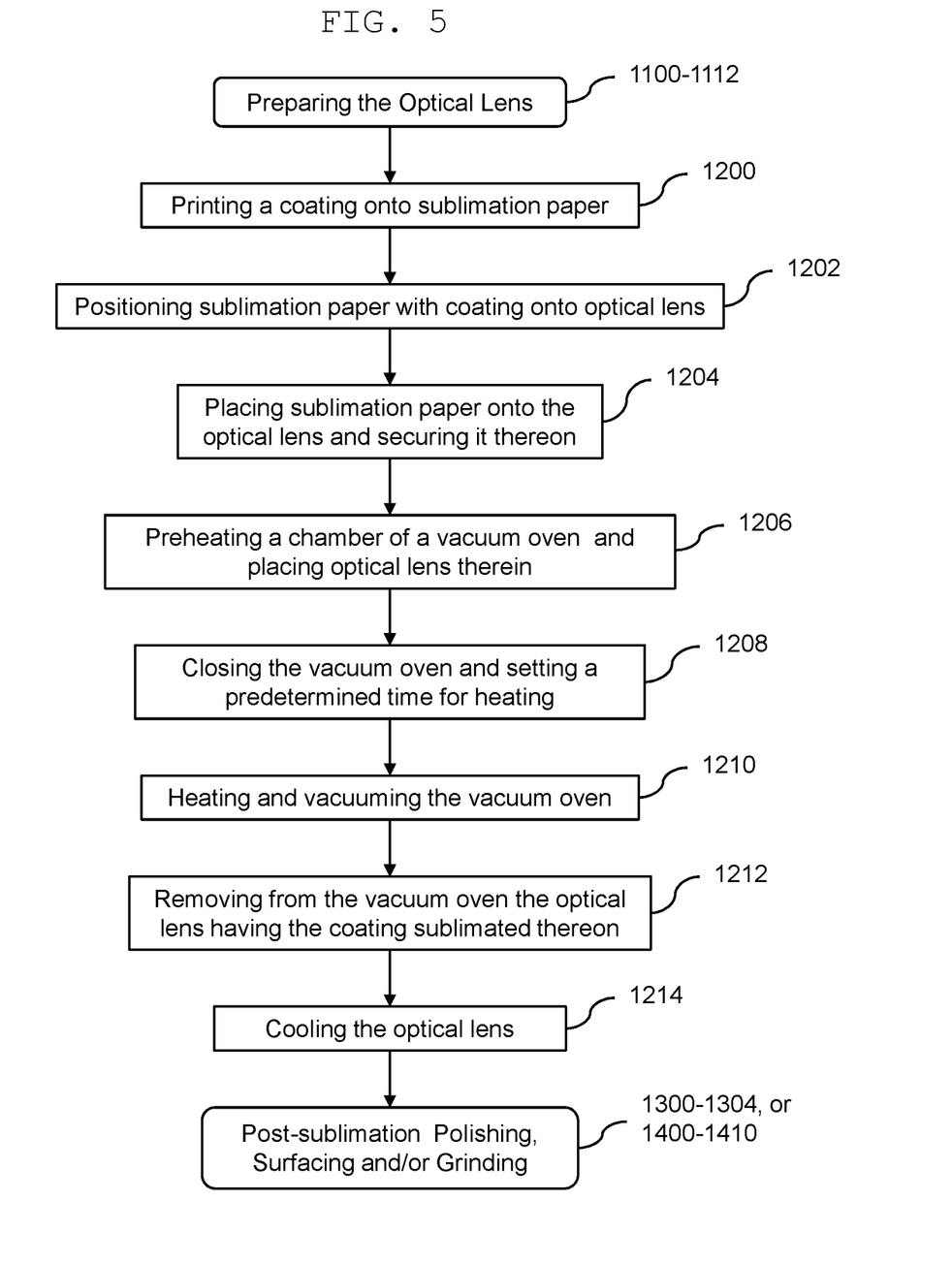
FIG. 5 is a flowchart showing a routine of a method in an embodiment to coat an optical lens by sublimation.

FIGS. 1, 2, and 5 illustrate the process of sublimating a coating 21 onto an optical lens 30 comprising the steps of printing 1200 a first coating 21 using a sublimation transfer ink onto a sublimation paper 20; positioning 1202 the sublimation paper 20 onto the optical lens 30 such that the first coating 21 printed on the sublimation paper 20 is aligned to the first surface of the optical lens 30; placing 1204 the sublimation paper 20 onto the first surface of the optical lens 30 and securing 1204 the sublimation paper 20 onto the first surface of the optical lens 30 using materials such as heat-resistant tape and/or a rubber clamp; preheating 1206 a chamber 41 of a vacuum oven 40 to a predetermined temperature and placing the optical lens 30 into the chamber 41 of the vacuum oven 40 with the first surface of the optical lens 30 facing upward (this step can also include the optical lens 30 being placed upon a mold 31); closing and locking 1208 the vacuum oven 40 and setting a predetermined time for heating; heating and vacuuming 1210 the chamber 41 of the vacuum oven 40 during about the predetermined time such that the first coating 21 sublimates onto the first surface of the optical lens 30 from the sublimation paper 20; removing 1212 from the vacuum oven 40 the optical lens 30 having the first coating 21 on the first surface of the optical lens 30; and cooling 1214 the optical lens 30.

Figure 3A:
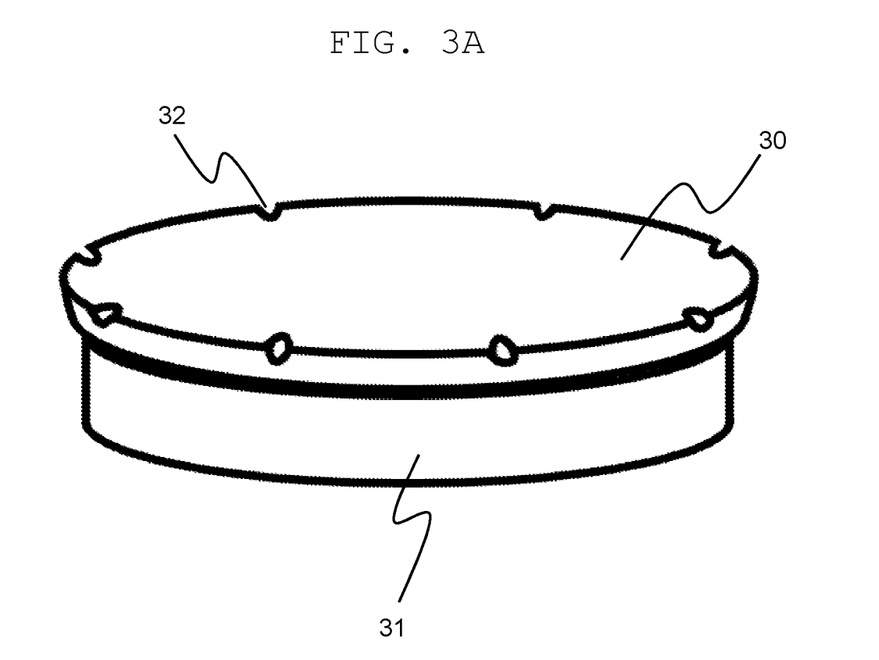
FIGS. 3A and 3B are perspective views of the optical lens placed on top of a mold.
Figure 3B:
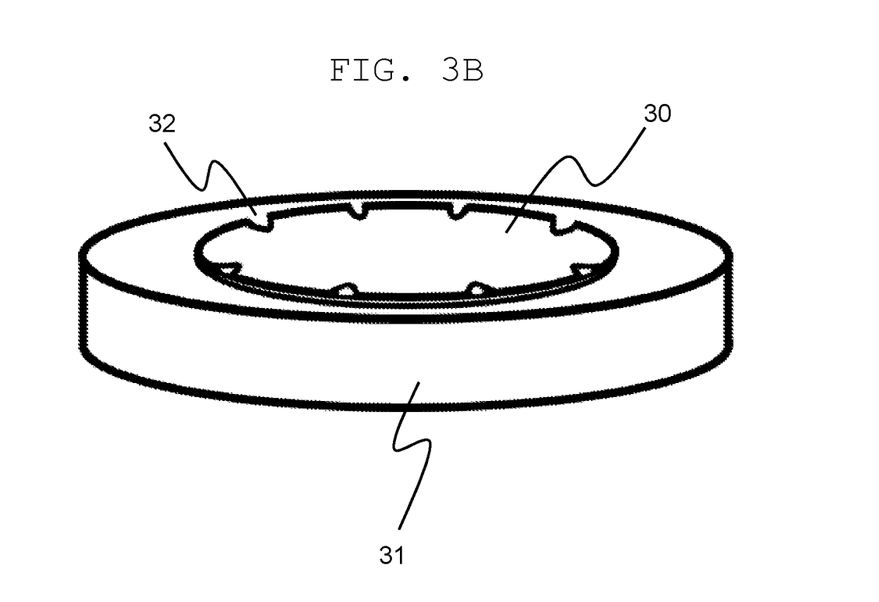

The first surface of the optical lens 30 can be convex. Alternatively, the first surface of the optical lens 30 is concave and the opposite second surface of the optical lens 30 is convex wherein an edge of the first surface of the optical lens 30 has a plurality of recesses 32. The recesses 32 allow air between the concave cavity of the lens and the sublimation paper 20 to be effectively evacuated when the air pump 42 is active, thus permitting the sublimation paper 20 to contact the concave surface. For a round lens like a semifinished lens, the recesses 32 can be evenly distributed on the edge of the concave surface, which would allow the air between the concave surface of the optical lens 30 and the sublimation paper 20 to be evacuated in a substantially even manner during the heating and vacuuming step 1210, which allows the subsequent transfer of the coating 21 from the sublimation paper 20 to the concave surface of the optical lens 30 to be substantially precise. If the first surface of the optical lens 30 is concave and second surface of the optical lens 30 is convex and a user desires have sublimate a color and/or design onto first surface of the optical lens 30 that is the concave, then during the step of placing 1206 the optical lens 30 into the chamber 41 of the vacuum oven 40 the user should place the optical lens 30 onto a mold 31, as shown in FIGS. 3A-B, that substantially corresponds to the convex second surface of the optical lens 30 such that the concave first surface of the optical lens 30 faces upward. The mold can be made of silicon, polycarbonate, or other plastic polymers. Optionally, additional gripping material may be placed over the mold but underneath the optical lens 30 if so desired to prevent any shifting between the optical lens 30 and the mold 31 if any. To remove the recesses 32 from the optical lens 30, the user should grind the optical lens 30 following the cooling step 1214 such that the recesses 32 are removed.

Figure 6:
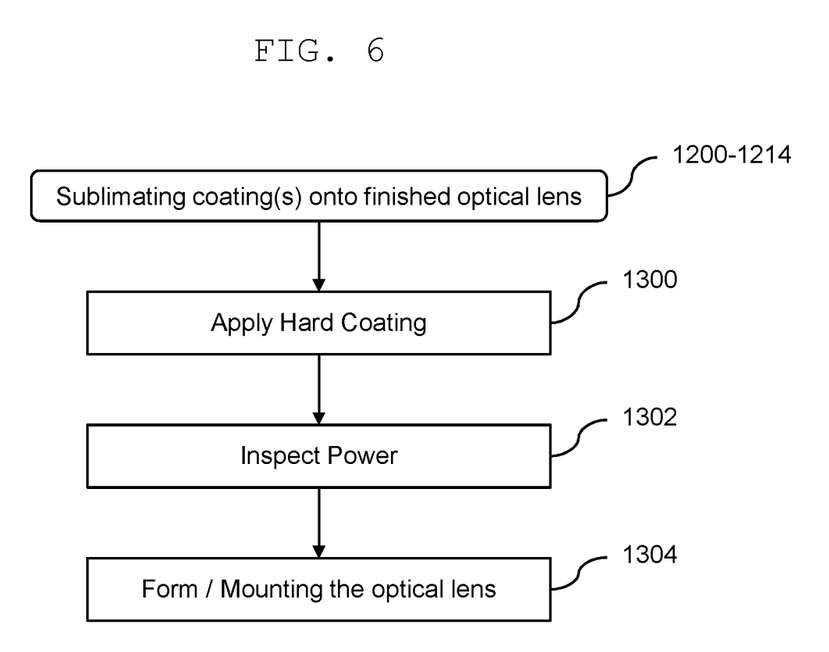
FIG. 6 is a flowchart showing additional steps for a finished lens following sublimation coating.

For an optical lens 30 that is a finished lens having color(s) and/or design(s) sublimated onto a surface of the finished lens, the temperature of the vacuum oven 40, and consequently the chamber 41, should be set to between 68-189° C., and the duration of the vacuum oven 40 is set to between 2-13 minutes at the above temperatures, which is summarized in Table 1 for a variety of different optical lens 30 material and types wherein 14 mm and 16 mm types of finished lens refers to their respective fitting heights as commonly known in the art. Additionally, as shown in FIG. 4, prior to the printing step above 1200, a user should add a hardcoat layer 1104 to the first and second surfaces of the optical lens 30. As shown in FIG. 6, after the cooling step 1214, a second hardcoat layer should be added 1300 to the first surface of the optical lens that includes the coating 21 sublimated on the first surface to enhance the longevity of the coating 21 and to prevent damage (physical and/or chemical) and/or discoloration to the coating 21 on the first surface. Once the power of the optical lens 30 is inspected 1302 and deemed to be satisfactory, the optical lens 30 could then be mounted 1304 into any number of optical lens receptacles or fashioned into any optical lens forms 1304.

Figure 7:
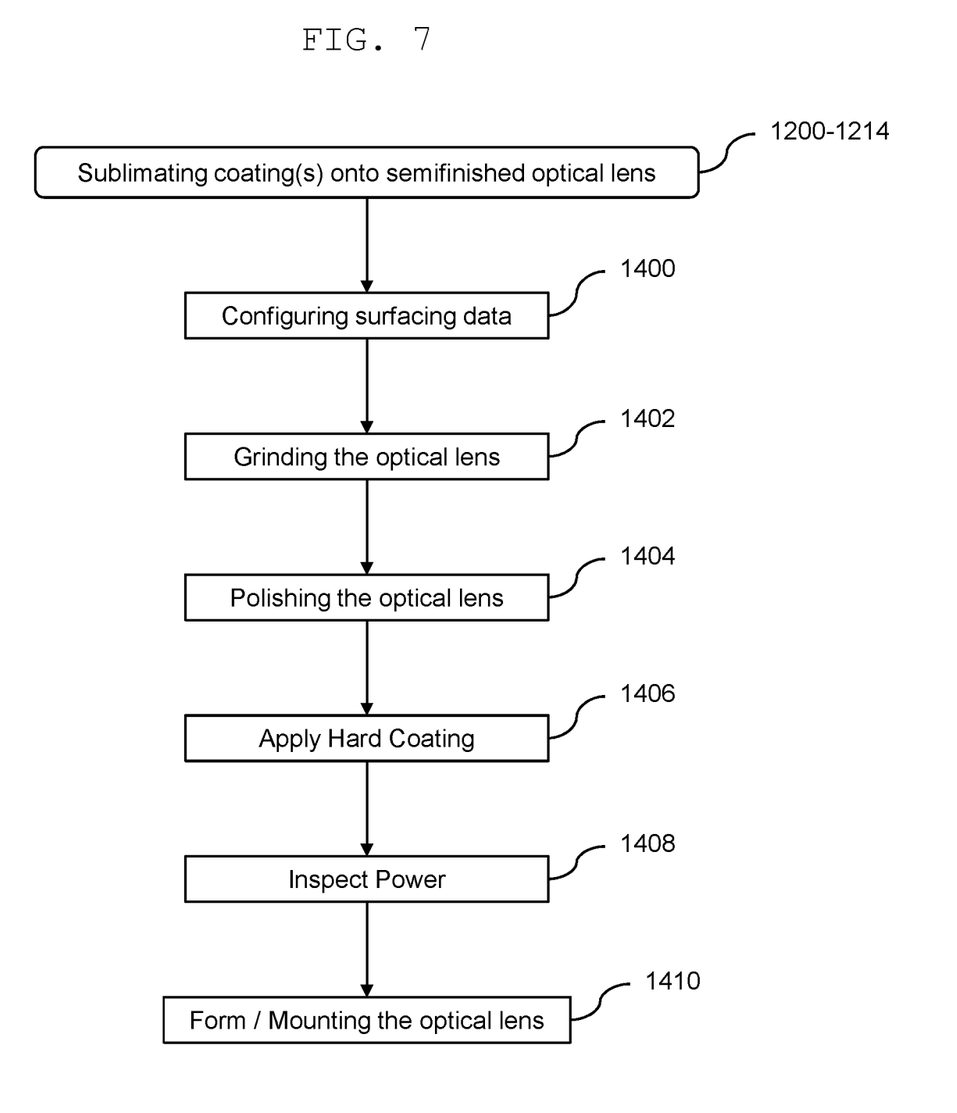
FIG. 7 is a flowchart showing additional steps for semi-finished lens following sublimation coating.

For an optical lens 30 that is a semifinished lens having color(s) and/or design(s) sublimated onto a surface of the, the temperature of the vacuum oven 40, and consequentially the chamber 41, should be set to between 68-189° C., and the duration of the vacuum oven 40 is set to run between 2-16 minutes at the above temperatures, which is summarized in Table 2 for a variety of different optical lens 30 material and types wherein 14 mm and 16 mm types of semifinished lens refers to their respective fitting eights as commonly in the art. Additional steps for an optical lens 30 that is semifinished should be done before and after sublimation of the color(s) and/or design(s) 1200-1214 that are represented by the coating 21 to the optical lens 30. Prior to the printing step 1200, as shown in FIG. 4, a user should add a hardcoat layer 1104 to the first surface of the optical lens 30. As shown in FIG. 7, following the cooling step 1214 after sublimation of the coating 21 to a surface of the optical lens 30, the user should measure a true curve data 1400 of the surface of the optical lens 30 using a device such as lens clock, particularly the surface of the optical lens having the coating 21 sublimated thereon since the curve might have changed following sublimation of the coating 21 to the that surface 1200-1214. Equipped with the true curve data, the user should grind 1402 the optical lens 30 to a specific shape and curvature based on the true curve data. Following the grinding step 1402, the optical lens should be polished 1404. Following the polishing step 1404, a second hardcoat layer should be added 1406 over the first surface of the optical lens 30 to protect the coating 21 sublimated on the first surface from discoloration and/or damage (physical and/or chemical) to the coating 21, thus increasing the longevity of the coating 21. Once the power of the optical lens 30 is inspected 1408 and deemed to be satisfactory, the optical lens 30 could then be mounted 1410 into any number of optical lens receptacles or fashioned into any optical lens forms 1410.

FIG. 2 shows a schematic of the process to coat the second surface of the optical lens 30 with a second coating. This process follows the earlier steps 1200-1214 involving the sublimation of a first coating onto a first surface of the optical lens 30, this process further comprising the steps of printing 1200 a second coating 21 using a sublimation transfer ink onto a sublimation paper 20; positioning 1202 the sublimation paper 20 onto the optical lens 30 (the optical lens 30 retrieved after the earlier cooling step 1214), such that the second coating 21 printed on the sublimation paper 20 is aligned to the second surface of the optical lens 30; placing 1204 the sublimation paper 20 onto the second surface of the optical lens 30 and securing the sublimation paper 20 onto the second surface of the optical lens 30 by materials such as heat-resistant tape and/or the rubber clamp; preheating 1206 the chamber 41 of the vacuum oven 40 to a predetermined temperature and placing the optical lens 30 into the chamber 41 of the vacuum oven 40 such that the second surface of the optical lens 30 faces upward; closing and locking the vacuum oven 40 and setting a predetermined time for heating 1208; heating and vacuuming 1210 the chamber 41 of the vacuum oven 40 during about the predetermined time such that the second coating 21 sublimates onto the second surface of the optical lens 30 from the sublimation paper 20; removing 1212 from the vacuum oven 40 the optical lens 30 having the second coating 21 on the second surface of the optical lens 30; and cooling 1214 the optical lens 30.

The second surface of the optical lens 30 may be convex. Alternatively, the first surface of the optical lens 30 is convex and the second surface of the optical lens 30 is concave, and an edge of the second surface of the optical lens 30 has a plurality of recesses 32. The recesses 32 allow air between the concave cavity of the lens and the sublimation paper 20 to be effectively evacuated when the air pump 42 is active, thus permitting the sublimation paper 20 to contact the concave surface. For a round lens like a semifinished lens, the recesses 32 can be evenly distributed on the edge of the concave surface as shown in FIG. 3A, which would allow the air between the concave surface of the optical lens 30 and the sublimation paper 20 to be evacuated in a substantially even manner during the heating and vacuuming step 1210, which allows the subsequent transfer of the coating 21 from the sublimation paper 20 to the concave surface of the optical lens 30 via sublimation to be substantially precise. If the first surface of the optical lens 30 is convex and the second surface of the optical lens 30 is concave, then this process further comprises the steps of placing the optical lens 30 onto a mold 31 that substantially corresponds to the first surface of the optical lens 30 such that the second surface of the optical lens 30 faces upward during the step of placing 1206 the optical lens 30 into the chamber 41 of the vacuum oven 40. The mold 31 may be made of silicon, polycarbonate, or other plastic polymers. Further, where the optical lens 30 is a finished lens in the above process, the temperature of the vacuum oven 40 should be set to between 68-189° C., and the duration of the vacuum oven 40 is set to between 2-12 minutes. The ranges for the temperature and duration parameters are summarized in Table 1 for a variety of different optical lens 30 material and types wherein 14 mm and 16 mm types of finished lens refers to their respective fitting heights as commonly known in the art.

An alternative process involves dual coating a first surface and a second surface of an optical lens 30 via sublimation that comprises the steps of printing 1200 a first coating and a second coating 21 using a sublimation transfer ink onto first and second sublimation papers 20 respectively; positioning 1202 the first sublimation paper 20 onto the first surface the optical lens 30 such that the first coating is aligned to the first surface of the optical lens 30; placing 1204 the first sublimation paper 20 onto the first surface of the optical lens 30 and securing the first sublimation paper 20 onto the first surface of the optical lens 30 using materials such as heat-resistant tape and/or a rubber clamp; positioning 1202 the second sublimation paper 20 onto the second surface of the optical lens 30 such that the second coating is aligned to the second surface of the optical lens 30; placing 1204 the second sublimation paper 20 onto the second surface of the optical lens 30 and securing the second sublimation paper 20 onto the second surface of the optical lens 30; placing 1204 the optical lens 30 on top of a mold 31 that substantially corresponds to the second surface of the optical lens 30 such that the first surface of the optical lens 30 faces upwards; preheating 1206 a chamber 41 of the vacuum oven 40 to a predetermined temperature and placing the optical lens 30 and the mold 31 into the chamber 41 of the vacuum oven 40 such that the first surface of the optical lens 30 faces upwards; closing 1208 and locking the vacuum oven 40 and setting a predetermined duration to heat the optical lens 30; heating and vacuuming 1210 the chamber 41 of the vacuum oven 40 during the predetermined duration to permit the first coating and the second coating to transfer onto the first surface and the second surface of optical lens 30 respectively via sublimation; removing 1212 from the vacuum oven 40 the mold 31 and the optical lens 30, wherein the first surface and the second surface of the optical lens 30 have the first and second coatings sublimated onto the first surface and the second surface of the optical lens 30 respectively, and separating the optical lens 30 from the mold 31; and cooling 1214 the optical lens 30 wherein the first surface of the optical lens 30 is concave. The dual coating of surfaces has an important aesthetic advantage wherein the color(s) and/or design(s) of the first and second coatings 21 on the first and second surfaces of the optical lens respectively are such that the color(s) and/or design(s) turn back and forth (contrast or enhance each other) such that the color(s) and/or design(s) can be expressed in three dimensions.

Additionally, as shown in FIG. 4, the process detailed in the preceding paragraph further comprises the steps of adding 1104 a hardcoat layer to the first and second surfaces of the optical lens 30 prior to the positioning step 1202; and, as shown in FIG. 3, creating a plurality of recesses 32 on an edge of the first surface of the optical lens 30 prior to the step of positioning 1202 the first sublimation paper 20 onto the first surface the optical lens 30. The recesses 32 allow air between the concave cavity of the lens and the sublimation paper 20 to be effectively evacuated when the air pump 42 is active during the heating and vacuuming step 1210, thus permitting the sublimation paper 20 to contact the first surface. For a round lens like a semifinished lens, the recesses 32 can be evenly distributed on the edge of the concave surface, which would allow the air between the concave surface of the optical lens 30 and the sublimation paper 20 to be evacuated in a substantially even manner and the subsequent transfer of the coating 21 from the sublimation paper 20 to the concave surface of the optical lens 30 to be substantially precise. When the optical lens 30 is a semifinished lens, the temperature of the vacuum oven 40 is set to between 68-189° C., and the duration of the vacuum oven 40 is set to between 2-16 minutes, both of these parameters are summarized for different optical lens 30 types and materials in Table 2.

Further, the mold 31 can be made from silicon, polycarbonate, or other plastic polymers. Preferably, the mold 31 would permit heat transfer such that the second coating 21 is able to transfer to the second surface of the optical lens 30 in a manner that is substantially even and substantially precise. Further, as shown in FIG. 6, following the cooling step 1214 a second hardcoat layer should be added, 1300 or 1406 depending on whether the optical lens 30 is finished or semifinished, to the first and second surfaces of the optical lens 30 to protect the first and second coatings 21 already sublimated onto the first and second surfaces respectively. This step is performed to prevent discoloration and/or damage (physical and/or chemical) to the first and second coatings 21, thus increasing their longevity.

TABLE 1

| Thickness | Type  | Material      | Time (min) | Temp (° C.) |
|-----------|-------|---------------|------------|-------------|
| Finished  | 14 mm | CR-39         | 2-9        | 82-127      |
|           |       | Polycarbonate | 2-8        | 68-129      |
|           |       | 1.6           | 2-10       | 100-160     |
|           |       | 1.67          | 2-10       | 100-160     |
|           |       | 1.74          | 2-10       | 100-160     |
|           |       | Trivex        | 2-12       | 113-183     |

TABLE 1-continued

| Thickness | Type | Material | Time (min) | Temp (° C.) |
|---|---|---|---|---|
| | 16 mm | CR-39 | 3-9 | 85-130 |
| | | Polycarbonate | 3-9 | 72-132 |
| | | 1.6 | 3-11 | 105-165 |
| | | 1.67 | 3-11 | 105-165 |
| | | 1.74 | 3-11 | 105-165 |
| | | Trivex | 3-13 | 119-189 |

TABLE 2

| Thickness | Type | Material | Time (min) | Temp (° C.) |
|---|---|---|---|---|
| Semi Finished | 14 mm | CR-39 | 2-12 | 82-127 |
| | | Polycarbonate | 2-11 | 68-129 |
| | | 1.6 | 2-13 | 100-160 |
| | | 1.67 | 2-13 | 100-160 |
| | | 1.74 | 2-13 | 100-160 |
| | | Trivex | 2-15 | 113-183 |
| | 16 mm | CR-39 | 3-12 | 85-130 |
| | | Polycarbonate | 3-12 | 72-132 |
| | | 1.6 | 3-14 | 105-165 |
| | | 1.67 | 3-14 | 105-165 |
| | | 1.74 | 3-14 | 105-165 |
| | | Trivex | 3-16 | 119-189 |

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A method of sublimating a first coating onto an optical lens having a first and second surfaces, the method comprising the steps of:
   printing a first coating using a sublimation transfer ink onto a sublimation paper;
   positioning the sublimation paper onto the optical lens such that the first coating printed on the sublimation paper is aligned to the first surface of the optical lens;
   placing the sublimation paper onto the first surface of the optical lens and securing the sublimation paper onto the first surface of the optical lens;
   preheating a chamber of a vacuum oven to a predetermined temperature between 68° C. and 189° C.;
   placing the optical lens into the chamber of the vacuum oven with the first surface of the optical lens facing upward;
   closing the vacuum oven and setting a predetermined time between 2 minutes and 12 minutes for heating;
   heating and vacuuming the chamber of the vacuum oven during about the predetermined time such that the first coating sublimates onto the first surface of the optical lens from the sublimation paper;
   removing from the vacuum oven the optical lens having the first coating on the first surface of the optical lens; and
   cooling the optical lens,
   wherein the first surface of the optical lens is concave and the second surface of the optical lens is convex,
   wherein an edge of the first surface of the optical lens has a plurality of recesses,
   wherein the optical lens is a finished lens.

2. The method of claim 1 further comprising the step of placing the optical lens onto a mold that substantially corresponds to the second surface of the optical lens such that the first surface of the optical lens faces upward during the step of placing the optical lens into the chamber of the vacuum oven.

3. The method of claim 2 further comprising the steps of grinding the optical lens following the cooling step such that the recesses are removed.

4. The method of claim 2, wherein the mold is made of silicon, polycarbonate, or other plastic polymers.

5. The method of claim 1, the steps further comprising of adding a hardcoat layer to the first and second surfaces of the optical lens prior to the printing step; and
   adding a second hardcoat layer to the first surface of the optical lens following the cooling step.

6. The method of claim 1 further comprising the steps of printing a second coating using a sublimation transfer ink onto a sublimation paper;
   positioning the sublimation paper onto the optical lens such that the second coating printed on the sublimation paper is aligned to the second surface of the optical lens;
   placing the sublimation paper onto the second surface of the optical lens and securing the sublimation paper onto the second surface of the optical lens;
   preheating the chamber of the vacuum oven to a predetermined temperature;
   placing the optical lens into the chamber of the vacuum oven such that the second surface of the optical lens faces upward;
   closing the vacuum oven and setting a predetermined time for heating;
   heating and vacuuming the chamber of the vacuum oven during about the predetermined time such that the second coating sublimates onto the second surface of the optical lens from the sublimation paper;
   removing from the vacuum oven the optical lens having the second coating on the second surface of the optical lens; and
   cooling the optical lens.

7. A method for dual coating of a first surface and a second surface of an optical lens via sublimation, the steps comprising:
   printing a first coating and a second coating using a sublimation transfer ink onto first and second sublimation papers respectively;
   positioning the first sublimation paper onto the first surface the optical lens such that the first coating is aligned to the first surface of the optical lens;
   placing the first sublimation paper onto the first surface of the optical lens and securing the first sublimation paper onto the first surface of the optical lens;
   positioning the second sublimation paper onto the second surface of the optical lens such that the second coating is aligned to the second surface of the optical lens;
   placing the second sublimation paper onto the second surface of the optical lens and securing the second sublimation paper onto the second surface of the optical lens;
   placing the optical lens on top of a mold that substantially corresponds to the second surface of the optical lens such that the first surface of the optical lens faces upwards;
   preheating a chamber of the vacuum oven to a predetermined temperature between 68° C. and 189° C.;
   placing the optical lens and the mold into the chamber of the vacuum oven such that the first surface of the optical lens faces upwards;

closing the vacuum oven and setting a predetermined duration between 2 minutes and 12 minutes to heat the optical lens;

heating and vacuuming the chamber of the vacuum oven during the predetermined duration to permit the first coating and the second coating to transfer onto the first surface and the second surface of optical lens respectively via sublimation;

removing from the vacuum oven the mold and the optical lens, wherein the first surface and the second surface of the optical lens have the first and second coatings sublimated onto the first surface and the second surface of the optical lens respectively;

separating the optical lens from the mold; and cooling the optical lens, wherein the first surface of the optical lens is concave, wherein the second surface of the optical lens is convex, wherein an edge of the first surface of the optical lens has a plurality of recesses, wherein the optical lens is a finished lens.

8. The method of claim 7 further comprising the steps of adding a hardcoat layer to the first and second surfaces of the optical lens prior to the printing step;

creating a plurality of recesses on an edge of the first surface of the optical lens prior to the step of positioning the first sublimation paper onto the first surface the optical lens;

grinding the optical lens following the cooling step such that the recesses are removed;

adding a second hardcoat layer to the first and second surfaces of the optical lens following the cooling step.

9. The method of claim 7, wherein the mold is constructed from silicon, polycarbonate, or other plastic polymers.

10. A method of sublimating a first coating onto an optical lens having a first and second surfaces, the method comprising the steps of:

printing a first coating using a sublimation transfer ink onto a sublimation paper;

positioning the sublimation paper onto the optical lens such that the first coating printed on the sublimation paper is aligned to the first surface of the optical lens;

placing the sublimation paper onto the first surface of the optical lens and securing the sublimation paper onto the first surface of the optical lens;

preheating a chamber of a vacuum oven to a predetermined temperature between 68° C. and 189° C.;

placing the optical lens into the chamber of the vacuum oven with the first surface of the optical lens facing upward;

closing the vacuum oven and setting a predetermined time between 2 minutes and 16 minutes for heating;

heating and vacuuming the chamber of the vacuum oven during about the predetermined time such that the first coating sublimates onto the first surface of the optical lens from the sublimation paper;

removing from the vacuum oven the optical lens having the first coating on the first surface of the optical lens; and cooling the optical lens, wherein the first surface of the optical lens is concave, wherein an edge of the first surface of the optical lens has a plurality of recesses, wherein the optical lens is a semifinished lens.

11. The method of claim 10, further comprising the steps of adding a hardcoat layer to the first surface of the optical lens prior to the printing step;

measuring a true curve data of the first surface of the optical lens using a lens clock after the cooling step;

grinding at least the second surface the optical lens to a specific shape and curvature based on the true curve data;

polishing at least the second surface the optical lens after the grinding step; and adding a second hardcoat layer to the first surface of the optical lens following the cooling step after the polishing step.

12. The method of claim 10 further comprising the step of placing the optical lens onto a mold that substantially corresponds to the second surface of the optical lens such that the first surface of the optical lens faces upward during the step of placing the optical lens into the chamber of the vacuum oven.

13. The method of claim 12 further comprising the steps of grinding the optical lens following the cooling step such that the recesses are removed.

14. The method of claim 12, wherein the mold is made of silicon, polycarbonate, or other plastic polymers.

15. The method of claim 10, wherein the second surface of the optical lens is concave.

16. The method of claim 10, wherein the second surface of the optical lens is convex.

* * * * *